Dec. 2, 1941.    F. A. HENSCHELL    2,264,374
FLEXIBLE BLADE POT SCRAPER
Filed April 19, 1939
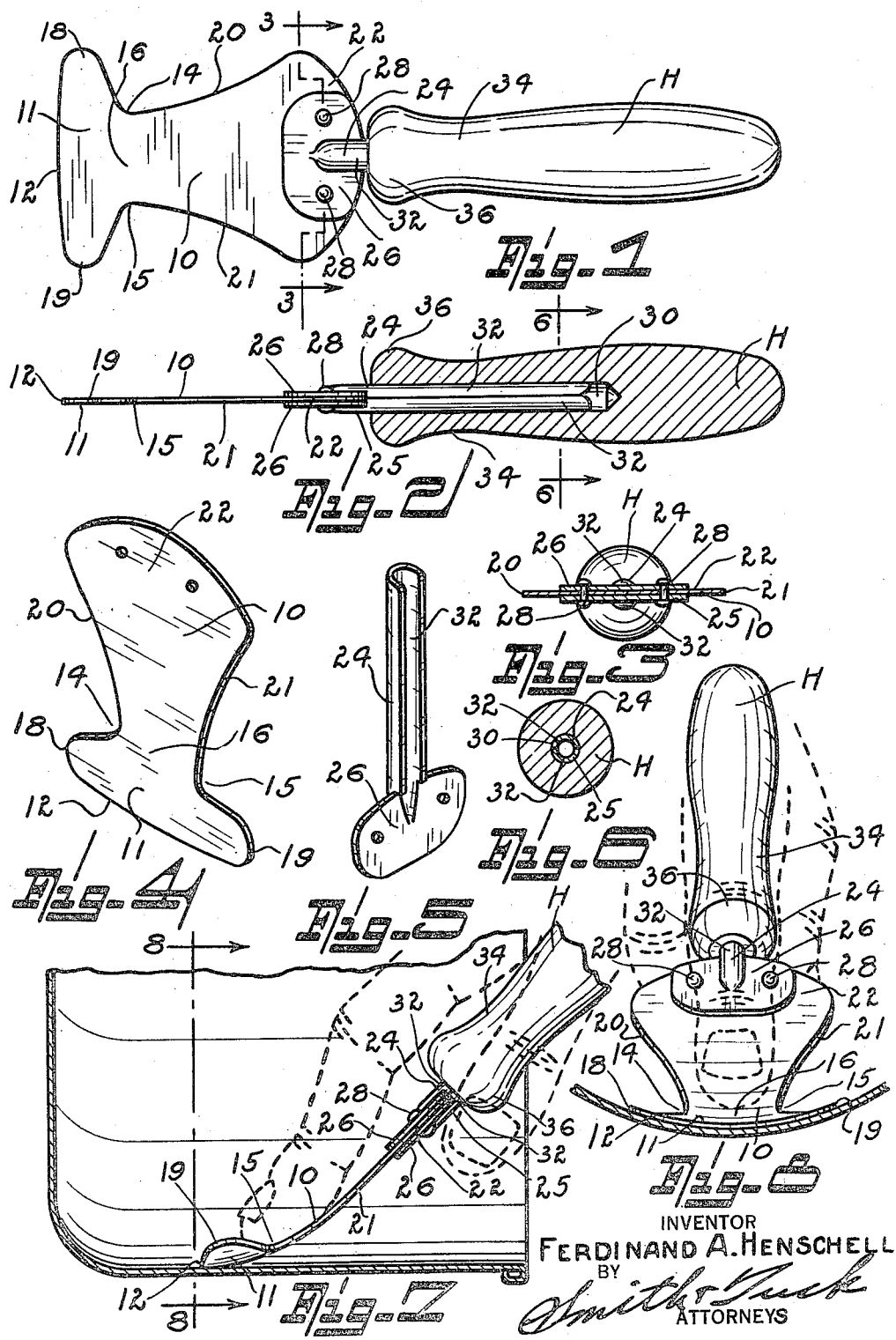
INVENTOR
FERDINAND A. HENSCHELL
BY
Smith Tuck
ATTORNEYS Patented Dec. 2, 1941

2,264,374

UNITED STATES PATENT OFFICE 2,264,374

FLEXIBLE BLADE POT SCRAPER

Ferdinand A. Henschell, Vancouver,
British Columbia, Canada

Application April 19, 1939, Serial No. 268,801

2 Claims. (Cl. 30—169)

My present invention relates to the art of kitchen utensils, and more particularly to a flexible blade pot scraper.

My device consists essentially of a thin, flexible blade, so shaped that it can easily be made to conform to the curvature of the various portions of a pot or kettle, having a handle of such shape that the device will be convenient to use.

The cleaning of vessels of various types, particularly kitchen utensils, presents a different problem. With the increased use of aluminum kettles particularly, it is found that there is no truly satisfactory method of cleaning the same. Ordinarily, steel or copper wool, either in tufts or in pads, is used. However, aluminum is universally known as a porous metal, and small particles of the metal wool become lodged in the tiny pores of the metal. When this occurs there is always present a dangerous condition, in that, whether steel, copper or brass wool is used, an electromotive couple is provided, which, through galvanic action, can create many poisonous compounds. These, being produced in tiny localities, usually pass unobserved, yet in their aggregate can create a condition that seriously endangers the health of those who are served from such vessels.

It is, therefore, the principal object of my present invention to provide a scraper which is so arranged that it, itself, can be kept clean in contradistinction to the various metal walls, and which, because of its particular shape, can be made to closely fit the curvature of various types of pots and different positions in the pots.

Another important object of my device is to so shape the flexible scraper plate that reasonably light pressure will cause it to form a snug engagement with the surface cleaned, throughout the working face of the scraper.

A further object of my present invention is to provide an article of manufacture that can be very economically manufactured.

A still further object is to provide a cleaning or scraping utensil which, because of its construction, will give a long, useful life.

Other and more specific objects will be apparent from the following descriptions taken in connection with the accompanying drawing, wherein Figure 1 is a face view of my pot scraper, showing the proportions that have been found most generally useful.

Figure 2 is a side elevation of the device in Figure 1 with the handle being shown in section.

Figure 3 is a cross-sectional view along the line 3—3 of Figure 1.

Figure 4 is a perspective view showing the thin, flexible blade used in my device.

Figure 5 is a perspective view showing one of the two identical members at present found desirable to anchor the flexible blade to the handle.

Figure 6 is a cross-sectional view taken along the line 6—6 of Figure 2.

Figure 7 illustrates the manner of using my device and shows the same as used on the side wall of a kettle, the kettle itself being shown in fragmentary form and in section as it would appear when laid on its side, the user's finger that gives the pressure to produce the curvature being shown in dashed lines.

Figure 8 is a view taken along the line 8—8 of Figure 7, showing the sidewalls of a pot in section and again showing the user's finger in dashed lines.

Referring to the drawing, throughout which like reference characters indicate like parts, 10 designates the blade of my scraper or cleaner. This at present I prefer to form from stainless steel of sufficiently light gauge and temper so that the pressure of a person's forefinger in the center of the blade will be sufficient to cause it to conform to the curvature of the surface being cleaned. There are, for certain uses, already available, plastics that serve very satisfactorily for this purpose, and no doubt as these materials are further developed they will find a ready use in this device. In order to assure a close fit to the curved surfaces on which scrapers of this kind are normally used, I have found it desirable to have a bearing edge 12, and then to cut away the material at 14 and 15 so that a reduced neck portion 16 is formed. This gives a scraper portion 11, bounded by the working edge 12 and the reduced portion 16 that is, in effect, a narrow strip of material on which, being of light gauge, the average woman's forefinger can exert sufficient pressure, after the showing of Figures 7 and 8, to readily bend this cleaning member into the various curves encountered in the ordinary range of pots and kettles. It is desirable, to prevent scratching of the pot surface, to provide a bearing edge as a curve on a very long radius, and to form the end of the scraper with curves after the proportions shown in Figure 1, particularly at 18 and 19. These curves make it possible to get well into the small radius curves that occur at the juncture of the bottom and sidewalls of many kettles and pans.

In order to give reasonable rigidity to blade 10, through an arching effect, it is desirable to have the side margins, as 20 and 21, diverge so that the base portion 22 will have about the same transverse extent as the scraper portion 11. This wider portion should be held in a substantially straight plane in its center portion, as by the two securing members 24 and 25, which are fanned out at their ends to form the bearing pads 26. The scraper is secured between these bearing pads, as by rivets 28. It has been found desirable not to have this pad, however, extend to the extreme limits of base 22, but rather to follow the general proportions shown in Figure 1, so that blade 10 may be bent throughout its entire length, in both planes, that indicated in Figure 7 and that indicated in Figure 8; and, if the proportions indicated are generally followed, it will be found that this member can be easily bent in both these planes. This is a characteristic of my scraper that adds a great deal to its general utility.

The blade supporting members 24 and 25, if two of them are used as indicated, may then be secured to handle H in some convenient manner. In the present showing I have indicated the handle as bored out at 30, so that the semitubular portion 32 of members 24 and 25 may be pressed into this opening and be held either friction tight, by gluing, or by riveting thereto. The exact shape of handle H is a matter of individual preference. It has been found most convenient, however, to have the handle reduced somewhat at 34 with a swelling at its lower end 36. This shape will be found most convenient, particularly when considerable pressure is applied to the scraper.

The manner in which this device is used will be apparent, it is believed, from a study of Figures 7 and 8. It is used somewhat after the fashion of a putty knife or a spatula, and it combines in a single implement the best features of these two devices and, because of its shape, can be used most effectively in the cleaning of any pot or pan yet observed. This is particularly true when food has been burned or allowed to dry to a hard crust in frying pans, roasters, dripping pans and the like.

The foregoing description and the accompanying drawing are believed to clearly disclose a preferred embodiment of my invention, but it will be understood that this disclosure is merely illustrative and that such changes in the invention may be made as are fairly within the scope and spirit of the following claims:

Having thus fully described my invention what I claim as new and desire to secure by Letters Patent is:

1. A utensil scraper blade comprising a body of sheet metal adapted to be flexed in use and including a front arcuate scraper edge of substantial width to permit transverse flexing by finger pressure, said body having an intermediate neck portion directly back from the front scraper edge to permit longitudinal flexing of the body by finger pressure and providing symmetrical lateral scraper wings integral with the front scraper, said wings being substantially semicircular and having edges that merge tangentially with the front scraper edge and with the edges of the neck portion, said body diverging rearwardly from the intermediate neck portion and terminating in a wide base that resists flexure of that portion when finger pressure is applied to flex the front and lateral scraper portions.

2. A utensil scraper blade comprising a body of sheet metal adapted to be flexed in use and including a front arcuate scraper edge of substantial width to permit transverse flexing by finger pressure, said body having an intermediate neck portion directly back from the front scraper edge to permit longitudinal flexing of the body by finger pressure and providing symmetrical lateral scraper wings integral with the front scraper, said wings being substantially semicircular and having edges that merge tangentially with the front scraper edge and with the edges of the neck portion, said body diverging rearwardly from the intermediate neck portion and terminating in a wide base that resists flexure of that portion when finger pressure is applied to flex the front and lateral scraper portions, and a handle having a laterally flared pad rigidly secured to said wide base to restrict flexure of that portion of the blade.

FERDINAND A. HENSCHELL.